United States Patent
Liu et al.

(10) Patent No.: US 12,439,089 B2
(45) Date of Patent: Oct. 7, 2025

(54) SHORT DISTANCE PREDICTIONS FOR RESIDUAL BLOCKS

(71) Applicant: Tencent America LLC, Palo Alto, CA (US)

(72) Inventors: Tianqi Liu, Palo Alto, CA (US); Liang Zhao, Palo Alto, CA (US); Jing Ye, Palo Alto, CA (US); Han Gao, Palo Alto, CA (US); Xin Zhao, Palo Alto, CA (US); Shan Liu, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 84 days.

(21) Appl. No.: 18/480,957

(22) Filed: Oct. 4, 2023

(65) Prior Publication Data
US 2025/0119585 A1   Apr. 10, 2025

(51) Int. Cl.
*H04N 19/70*   (2014.01)
*H04N 19/159*  (2014.01)
*H04N 19/176*  (2014.01)
*H04N 19/46*   (2014.01)

(52) U.S. Cl.
CPC .......... *H04N 19/70* (2014.11); *H04N 19/159* (2014.11); *H04N 19/176* (2014.11); *H04N 19/46* (2014.11)

(58) Field of Classification Search
CPC .... H04N 19/70; H04N 19/159; H04N 19/176; H04N 19/46
See application file for complete search history.

(56) References Cited

U.S. PATENT DOCUMENTS

| | | |
|---|---|---|
| 2003/0156648 A1 | 8/2003 | Holcomb et al. |
| 2013/0022107 A1 | 1/2013 | Van der AuWera et al. |
| 2013/0089138 A1 | 4/2013 | Guo et al. |
| 2013/0136175 A1 | 5/2013 | Wang et al. |

(Continued)

OTHER PUBLICATIONS

Dong Liu et al., "Deep Learning-Based Video Coding: A Review and a Case Study", ACM Computing Surveys, Apr. 29, 2019, 35 pgs., Retrieved from the Internet: https://arxiv.org/pdf/1904.12462.pdf.

(Continued)

*Primary Examiner* — Nam D Pham
(74) *Attorney, Agent, or Firm* — Morgan, Lewis & Bockius LLP

(57) ABSTRACT

The various implementations described herein include methods and systems for coding video. In one aspect, a method of video decoding includes receiving video data that includes a first block and a plurality of residual coefficients, from a video bitstream. The first block is encoded in an intra prediction mode, and the plurality of residual coefficients are generated by applying a short distance intra prediction to a residue block for the first block. The residue block generated from applying the intra prediction mode to the first block. The method includes generating, from the plurality of residual coefficients, a refined residue block for the first block, and generating a reconstructed residue block for the first block, where the reconstructed residue block is generated using an intra prediction block and the refined residue block. The method also includes reconstructing the first block using the refined residue block.

20 Claims, 10 Drawing Sheets

(56) References Cited

U.S. PATENT DOCUMENTS

| | | |
|---|---|---|
| 2014/0092983 A1 | 4/2014 | Joshi et al. |
| 2017/0150183 A1 | 5/2017 | Zhang et al. |
| 2019/0166380 A1 | 5/2019 | Chen et al. |
| 2020/0021818 A1 | 1/2020 | Seregin et al. |
| 2020/0092583 A1 | 3/2020 | Zhao et al. |
| 2020/0169749 A1 | 5/2020 | Hsu et al. |
| 2020/0260078 A1 | 8/2020 | Zhao et al. |
| 2022/0286709 A1 | 9/2022 | Zhu et al. |
| 2023/0074457 A1* | 3/2023 | Filippov ............... H04N 19/176 |
| 2023/0082092 A1 | 3/2023 | Kang et al. |
| 2024/0430426 A1* | 12/2024 | Wei ...................... H04N 19/174 |

OTHER PUBLICATIONS

Tencent Technology, ISR/WO, PCT/US2023/078248, Feb. 21, 2024, 16 pgs.

Tencent Technology, ISR/WO, PCT/US2023/078250, Feb. 28, 2024, 15 pgs.

Tencent Technology, ISR/WO, PCT/US2023/078215, Feb. 14, 2024, 16 pgs.

Alican Nalci et al., "Forward Skip Coding for Prediction Residuals", Alliance for Open Media, Codec Working Group, Document: CWG-C002-v5, Feb. 2, 2022, 18 pgs.

David Flynn et al., "Overview of the Range Extensions for the HEVC Standard: Tools, Profiles, and Performance", IEEE Transactions on Circuits and Systems for Video Technology, vol. 26, No. 1, Jan. 2016, 16 pgs.

Peter de Rivaz et al., "AV1 Bitstream & Decoding Process Specification", The Alliance for Open Media, 08JAN2019, 681 pgs. Retrieved from the Internet: https://aomediacoodec.github.io/av1-spec.pdf.

Tung Nguyen et al., "Overview of the Screen Content Support in VVC: Applications, Coding Tools, and Performance", IEEE Transactions on Circuits and Systems for Video Technology, vol. 31, No. 10, Oct. 2021, 17 pgs.

\* cited by examiner

SHORT DISTANCE PREDICTIONS FOR RESIDUAL BLOCKS

TECHNICAL FIELD

The disclosed embodiments relate generally to image and video coding and compression, including but not limited to systems and methods for prediction of residual information.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

A comprehensive video codec typically encompasses multiple components, such as intra/inter prediction, transform coding, quantization, residual coding, and in-loop filtering, among others. To achieve even greater reduction in residual signals, various residue prediction technologies have been developed. These technologies forecast residue signals and encode the high order residues into the bitstream. The present disclosure describes methods and systems for enhancing video (image) compression, including advanced residue prediction techniques.

In accordance with some embodiments, a method of video encoding is provided. The method includes (i) receiving video data comprising a plurality of blocks, including a first block, where the first block is to be encoded in an intra prediction mode; (ii) generating a residue block for the first block by applying the intra prediction mode to the first block; (iii) generating a refined residue block for the first block by applying a short distance intra prediction to the residue block; and (iv) signaling the refined residue block via the video bitstream.

In accordance with some embodiments, a method of video decoding is provided. The method includes (i) receiving video data comprising a plurality of blocks, including a first block and a plurality of residual coefficients for the first block, from a video bitstream; (ii) generating, from the plurality of residual coefficients, a refined residue block for the first block; (iii) generating a reconstructed residue block for the first block, where the reconstructed residue block is generated using an intra prediction block and the refined residue block; and (iv) reconstructing the first block using the reconstructed residue block.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes systems and methods of predicting residual information. The systems and methods described herein can improve the performance of lossless coding by reducing redundancy in the residue domain. In some embodiments, a line-by-line residual domain prediction mode is implemented for the vertical and/or horizontal intra prediction modes. For luma and chroma planes, the flags that indicate the utilization of the proposed method can be signaled separately, while the U and V planes may share one flag.

In some embodiments, a residue block is generated (e.g., by applying an intra prediction mode to a current block) and then a refined residue block is generated (e.g., by applying a short distance intra prediction to the residue block). Generating and using the refined residue block can reduce redundancy in the residue domain. Reducing redundancy reduces the number of bits needed to signal the residuals (e.g., improves coding efficiency and reduces transmission bandwidth).

Example Systems and Devices

Figure 1:
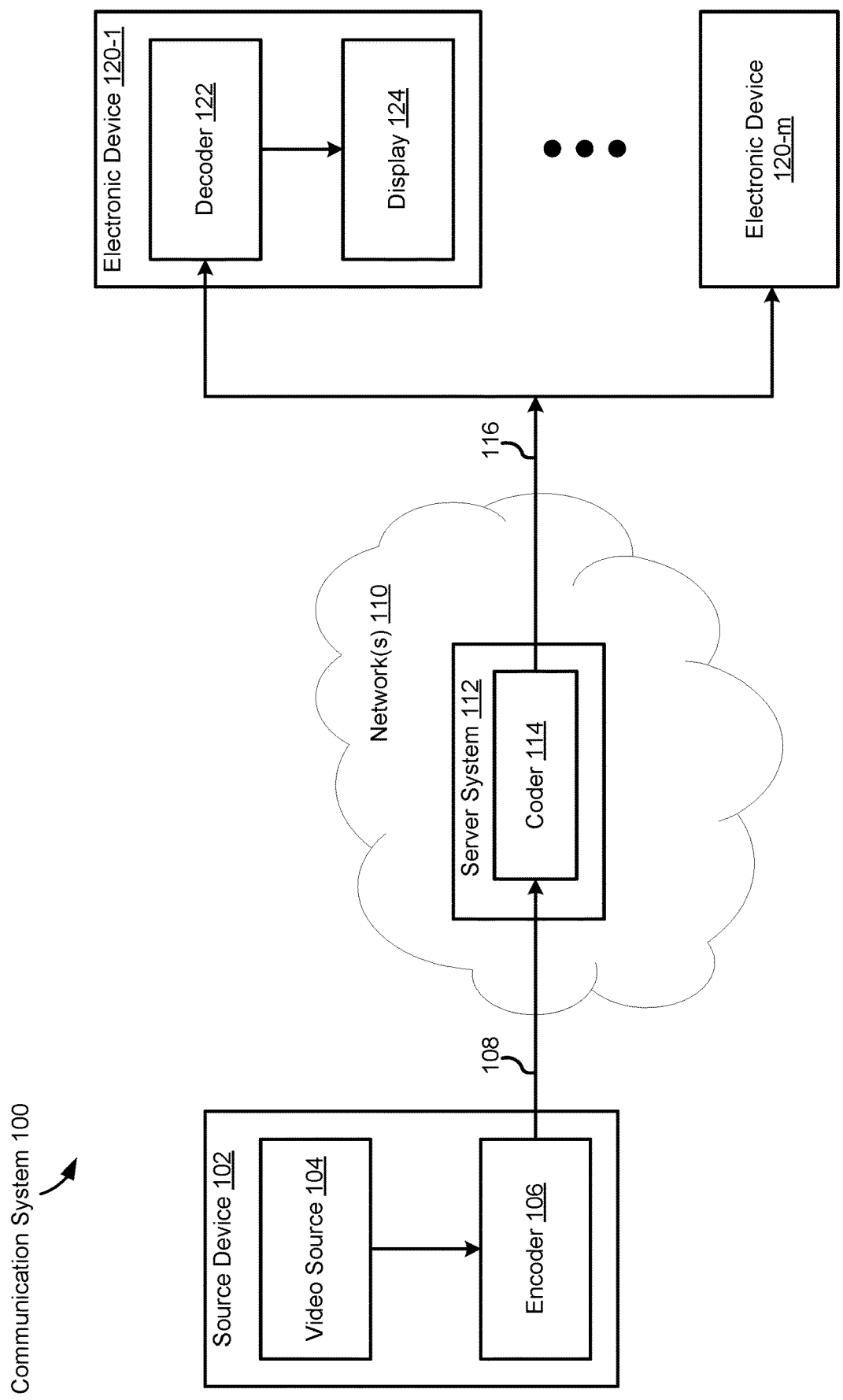
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
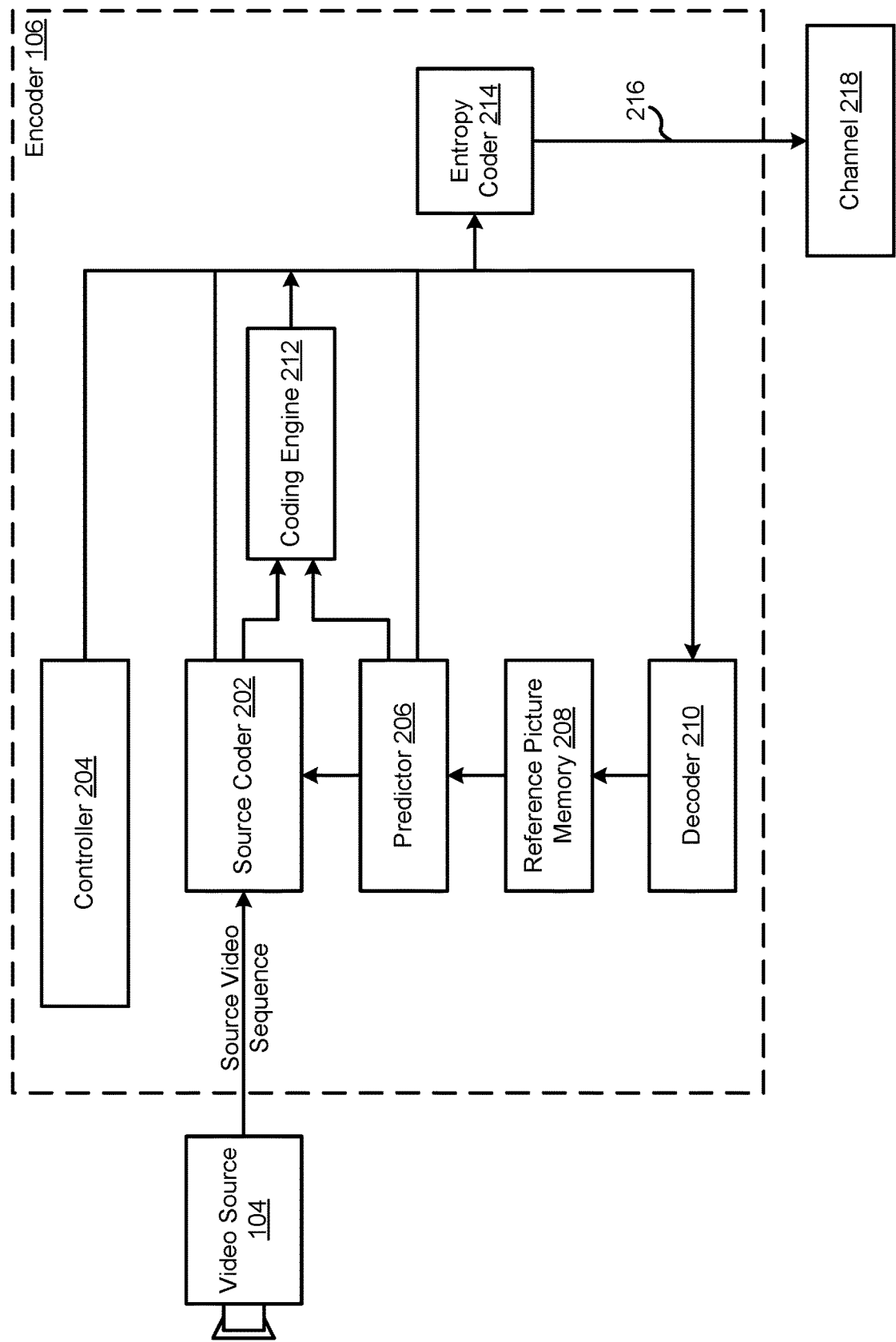
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
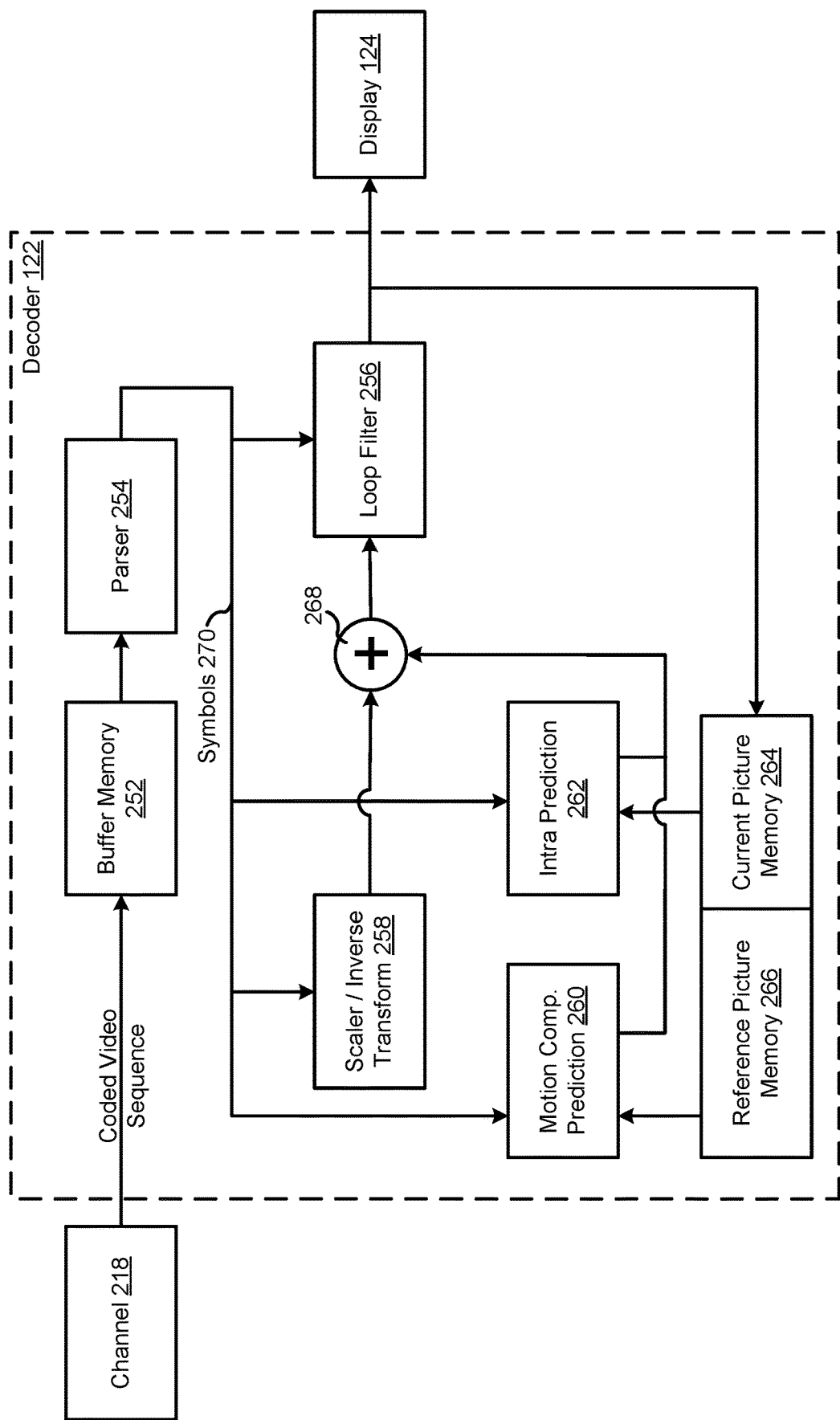
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
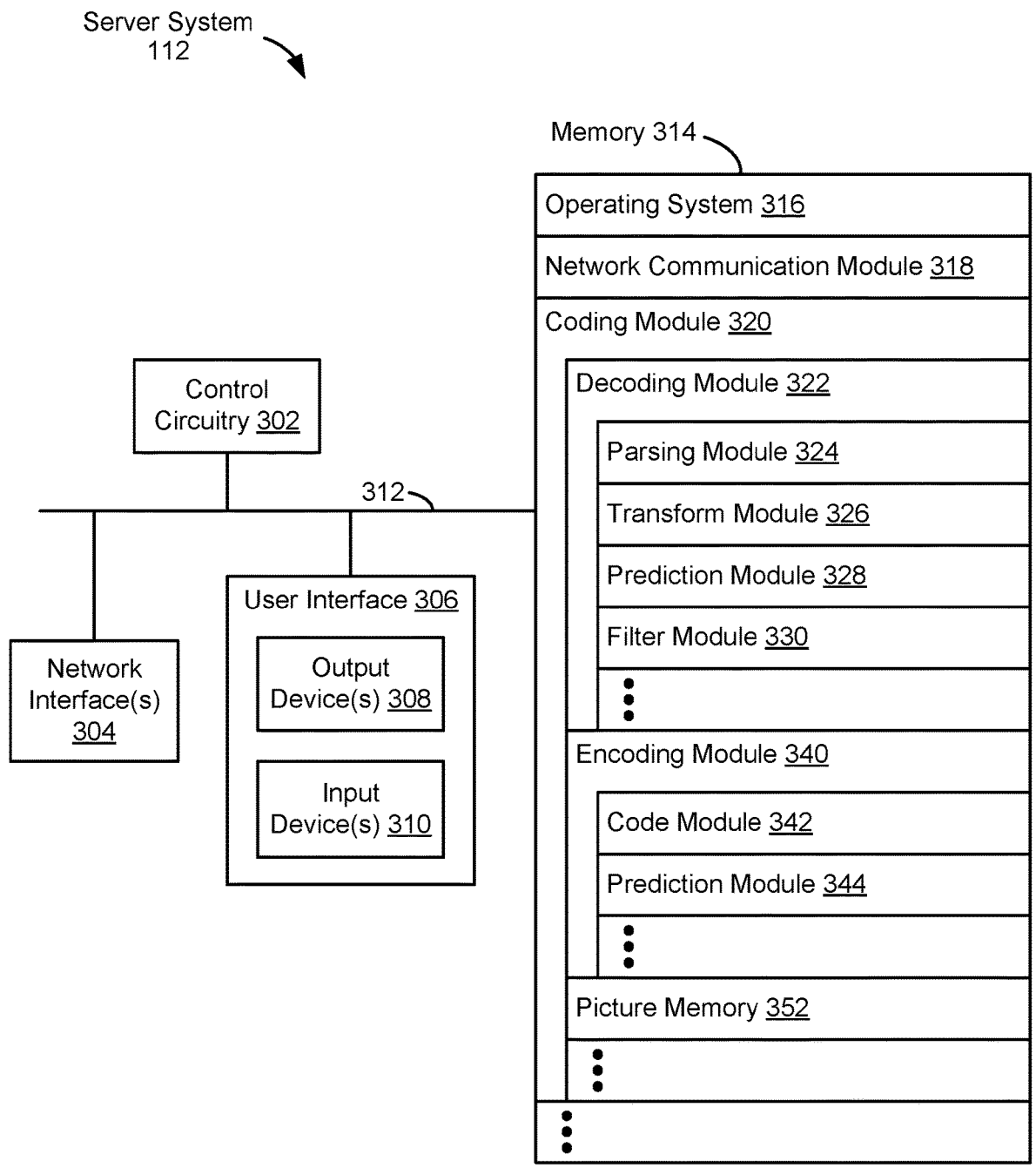
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

As discussed above, some codecs (e.g., AV1) operate on pixel blocks. Each pixel block may be processed in a predictive-transform coding scheme, where a prediction is obtained using intra frame reference pixels, inter frame motion compensation, or some combinations of the two. The residuals from the prediction may undergo a transform (e.g., a 2-D unitary transform) to further remove spatial correlations and the transform coefficients are quantized. Both the prediction syntax elements and the quantized transform coefficient indexes may then entropy coded using arithmetic coding.

Figure 4A:
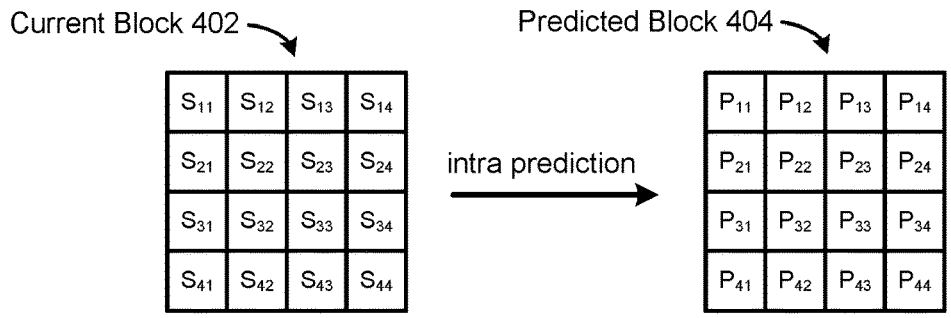
FIG. 4A illustrates the computation of a prediction block in accordance with some embodiments.
Figure 4B:
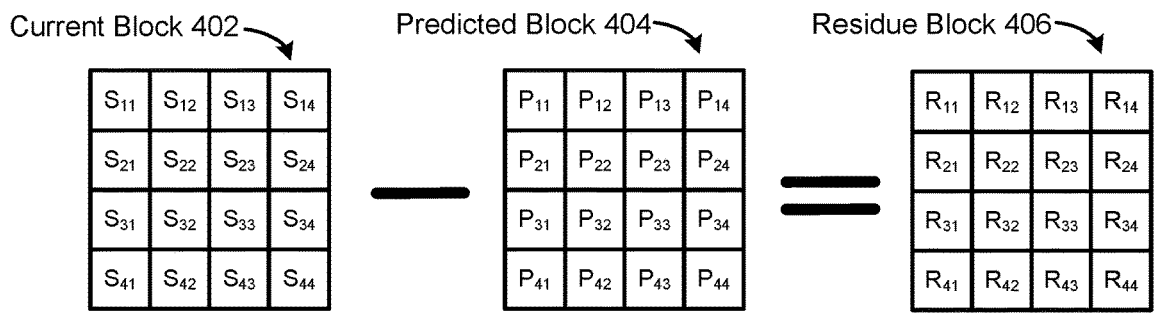
FIG. 4B illustrates the computation of a residue block in accordance with some embodiments.
Figure 4C:
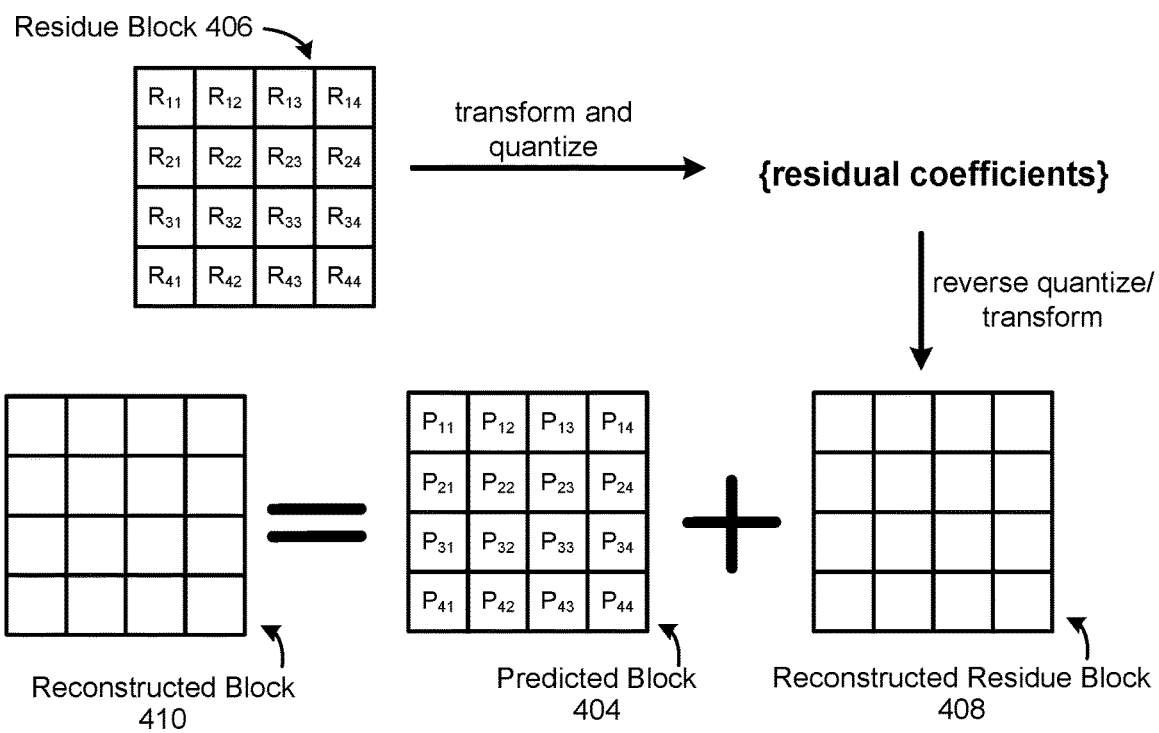
FIG. 4C illustrates the computation of a reconstructed block in accordance with some embodiments.

FIG. 4A illustrates an example computation of a prediction block. In the example of FIG. 4A, an intra prediction is performed on a current block 402 to generate a predicted block 404. The current block 402 includes a set of samples (e.g., pixel blocks), $S_{11}$ through $S_{44}$, and the prediction block 404 includes a set of predictions, $P_{11}$ through $P_{44}$, that correspond to the set of samples. FIG. 4B illustrates the computation of a residue block in accordance with some embodiments. As shown in FIG. 4B, the prediction block 404 is subtracted from the current block 402 to generate a residue block 406 that includes a set of residues, $R_{11}$ through $R_{44}$. For example, respective differences are calculated between each sample and the corresponding prediction. FIG. 4C illustrates the computation of a reconstructed block in accordance with some embodiments. As shown in FIG. 4C, the residue block 406 undergoes one or more transformations and quantization to generate a set of residual coefficients. The set of residual coefficients may be transmitted from an encoder component to a decoder component. The set of residual coefficients undergo a reverse quantization and reverse transformation to generate a reconstructed residue block 408. The reconstructed residue block 408 is combined with the predicted block 404 (e.g., reconstructed residues of the reconstructed residue block 408 are added to predictions of the prediction block 404) to generate a reconstructed block 410 corresponding to the current block 402.

To reduce the redundancy in residual signals, various residue prediction technologies have been developed. These technologies forecast residue signals and encode the refined residues. Residual Difference Pulse Code Modulation (RDPCM) entails employing sample-based differential pulse code modulation along the horizontal or vertical axes. By doing so, each residual row in the horizontal mode (or column in the case of vertical orientation) can be reconstructed at the decoder by summing the scaled differential pulse code modulation residual levels along the respective row (or column). RDPCM may be an explicit type or an implicit type. The explicit type requires supplementary signaling of the direction, and its application is confined to inter-predicted blocks exclusively. On the other hand, the implicit type doesn't require direction signaling and can only be applied to intra-predicted blocks, with the prediction direction tied to the intra prediction mode. Block-based Differential Pulse Code Modulation (BDPCM) performs sample-based differential pulse code modulation on the reconstructed samples, not the residual samples. The indication of the usage of the said second mode occurs during the prediction mode reconstruction process. This signaling involves two syntax elements each for both luma and chroma, e.g., the initial syntax element flag denotes its utilization, while the second syntax element flag specifies the horizontal or vertical direction.

To reduce the redundancy in the residual domain, a line-by-line residual prediction mode may be used to generate a refined residual block. The line-by-line residual domain prediction may be performed in a horizontal or vertical direction. For the horizontal prediction case, the prediction may be defined as shown in Equation 1 below, and for the vertical prediction case, the prediction may be defined as shown in Equation 2 below.

Equation 1—Horizontal Line-by-line Prediction $$p^h_{(x,y)} = \begin{cases} 0, x = 0 \\ r(x-1, y), \text{otherwise} \end{cases}$$

Equation 2—Vertical Line-by-line Prediction $$p^v_{(x,y)} = \begin{cases} 0, y = 0 \\ r(x, y-1), \text{otherwise} \end{cases}$$

where the x and y stand for the row index and column index, respectively, and r(*,*) denotes the pixel value in the original residual block (e.g., generated by intra prediction process).

In some embodiments, a bi-prediction mode is used to generate a refined residual block. The bi-prediction mode may be performed in a horizontal or vertical direction. For the horizontal prediction case for encoding, the prediction may be defined as shown in Equation 3 below, and for the vertical prediction case for encoding, the prediction may be defined as shown in Equation 4 below.

Equation 3—Horizontal Encoding Bi-Prediction $$p^{h,bip}_{(x,y)} = \begin{cases} 0, y = 0 \\ (w_1 \times r_{x,0} + (1-w_1) \times r_{x,3}), y = 1 \\ (w_2 \times r_{x,0} + (1-w_2) \times r_{x,3}), y = 2 \\ 0, y = 3 \end{cases}$$

Equation 4—Vertical Encoding Bi-Prediction $$p^{v,bip}_{(x,y)} = \begin{cases} 0, x = 0 \\ (w_1 \times r_{0,y} + (1-w_1) \times r_{3,y}), x = 1 \\ (w_2 \times r_{0,y} + (1-w_2) \times r_{3,y}), x = 2 \\ 0, x = 3 \end{cases}$$

where r(*,*) denotes the pixel value in the original residual block (e.g., generated by intra prediction process).

For the horizontal prediction case for decoding, the prediction may be defined as shown in Equation 5 below, and for the vertical prediction case for decoding, the prediction may be defined as shown in Equation 6 below.

Equation 5—Horizontal Decoding Bi-Prediction $$p^{h,bip}_{(x,y)} = \begin{cases} 0, y = 0 \\ (w_1 \times r'_{x,0} + (1-w_1) \times r'_{x,3}), y = 1 \\ (w_2 \times r'_{x,0} + (1-w_2) \times r'_{x,3}), y = 2 \\ 0, y = 3 \end{cases}$$

Equation 6—Vertical Decoding Bi-Prediction $$p^{v,bip}_{(x,y)} = \begin{cases} 0, x = 0 \\ (w_1 \times r'_{0,y} + (1-w_1) \times r'_{3,y}), x = 1 \\ (w_2 \times r'_{0,y} + (1-w_2) \times r'_{3,y}), x = 2 \\ 0, x = 3 \end{cases}$$

where r'(*,*) denotes the pixel value in the refined residual block. For example, the residue block values are determined by $r_{x,y} = r_{x,y} + p_{(x,y)}^{bip}$.

In some embodiments, intra prediction is conducted on one coded block or each sub-block in one coded block, yielding a residue block by subtracting the prediction block from the reconstructed samples of neighboring blocks. Then, short distance intra prediction is applied to the residue block, resulting in a refined residue block. For example, a refined residue signal may be calculated as shown in Equation 7 below.

$$\tilde{r}_{(x,y)} = r_{(x,y)} - p_{(x,y)} \qquad \text{Equation 7–Refined Residue Signal}$$

where $\tilde{r}_{(x,y)}$ denotes the refined residue signal.

The reconstruction process may be performed by summing the samples along the determined direction as shown below in Equations 8 and 9.

$$\tilde{r}^h(x, y) = \sum\nolimits_{i=0}^{x} \tilde{r}(i, y) \qquad \text{Equation 8–Horizontal Reconstruction}$$

$$\tilde{r}^v(x, y) = \sum\nolimits_{j=0}^{y} \tilde{r}(x, j) \qquad \text{Equation 9–Vertical Reconstruction}$$

Thus, a decoder according to embodiments of the present disclosure may receive video data comprising a plurality of blocks, including a first block and a plurality of residual coefficients, from a video bitstream. The first block is encoded in an intra prediction mode. Further, the plurality of residual coefficients are generated by applying a short distance intra prediction to a residue block for the first block. Moreover, the residue block generated from applying the intra prediction mode to the first block. Then, the decoder can generate, from the plurality of residual coefficients, a refined residue block for the first block, and reconstruct the first block using the refined residue block.

In some embodiments, a flag is signaled to indicate whether a line-by-line residual prediction mode is used. In some embodiments, the flag is signaled for luma and chroma component separately. In some embodiments, if the flag indicates that the line-by-line residual prediction mode is used, another flag is signaled to indicate whether the direction of the line-by-line residual prediction mode is vertical or horizontal. In some embodiments, the angle delta and/or the multiple reference line (MRL) index is inferred as zero when the line-by-line residual prediction mode is used. In some embodiments, the transform block size is fixed at a minimum transform size (e.g., 4×4) and the line-by-line residual prediction mode is implemented on the 4×4 residue blocks.

In some embodiments, a forward skip coding (FSC) mode is enabled with the line-by-line residual prediction mode (e.g., in a lossless coding scheme). FSC may be a simpler and more efficient residual coding approach for coefficients obtained after a 2-D identity transform (IDTX). FSC coded blocks have lesser TU level signaling since the transform type signaling and the end-of-block index signaling are avoided for IDTX blocks, where the former reduces the symbol counts in TX_SET_INTRA sets by 1 each. Finally, FSC is designed as a cheaper coding mode alternative for intra blocks since it disables signaling of the multiple reference line (MRL) index, filter intra mode, and angle delta syntax when the transform type is IDTX, which can simplify the reconstruction process for FSC blocks.

Figure 4D:
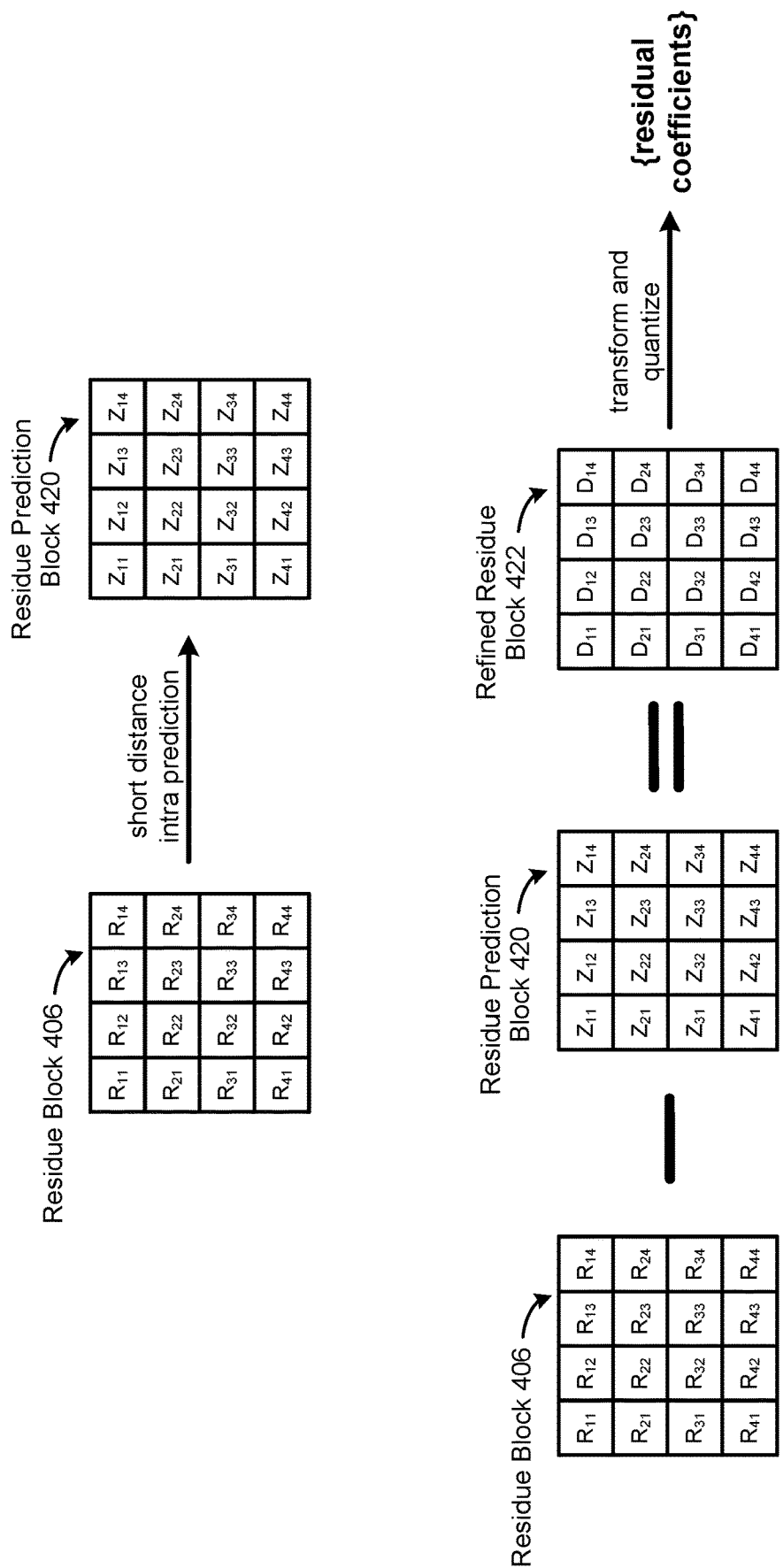
FIG. 4D illustrates the computation of a residue prediction block and a refined residue block in accordance with some embodiments.

FIG. 4D illustrates the computation of a residue prediction block and a refined residue block in accordance with some embodiments. As shown in FIG. 4D, a short distance intra prediction is applied to the residue block 406 to generate a residue prediction block 420 that includes residues $Z_{11}$ through $Z_{44}$. As discussed in more detail below, the short distance intra prediction may include a line-by-line prediction and/or a bi-directional prediction. FIG. 4D also shows generation of a refined residue block 422 that includes residue differences $D_{11}$ through $D_{44}$ obtained by subtracting the residue prediction block 420 from the residue block 406. In accordance with some embodiments, the residue differences are used to generate residual coefficients (e.g., via one or more transformations and quantization). For example, the residue differences are used as an alternative to the residues of the residue block 406.

Figure 4E:
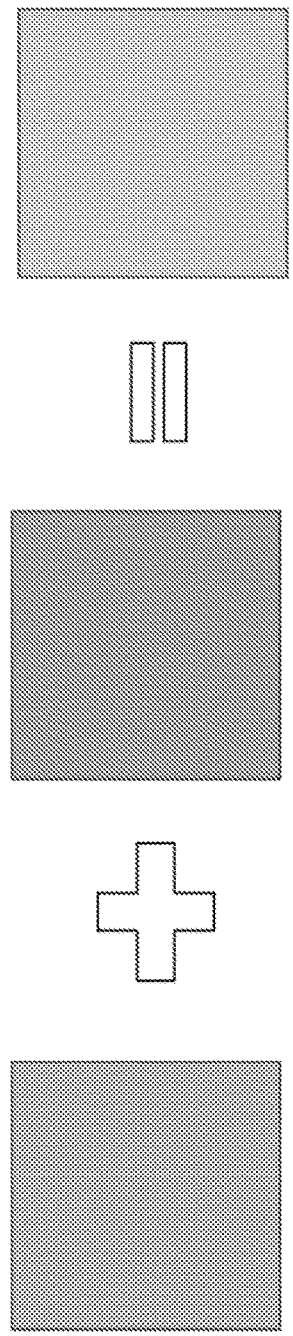
FIG. 4E illustrates the computation of residue and reconstructed blocks in accordance with some embodiments.
Figure 4E:
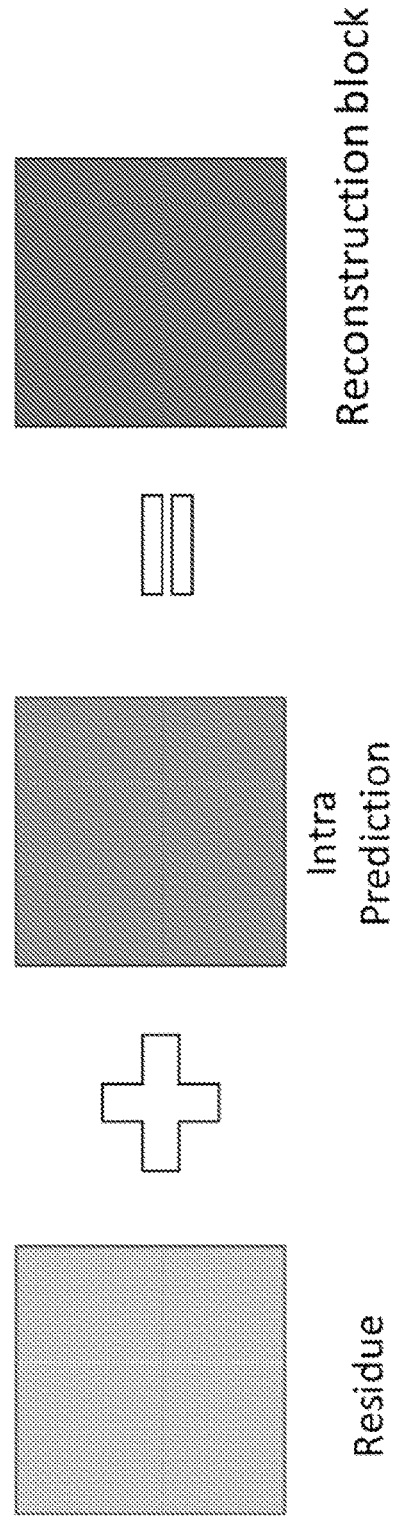

FIG. 4E illustrates the computation of residue and reconstructed blocks during a decoding process in accordance with some embodiments. For example, refined residue coefficients are received, and the refined residue block is recovered from the coefficients (e.g., using an inverse transform and inverse quantization process). After the refined residue block is recovered, a short distance intra prediction may be applied to recover the residue block. After the residue block is recovered, an intra prediction may be applied to recover the reconstruction block.

Figure 4F:
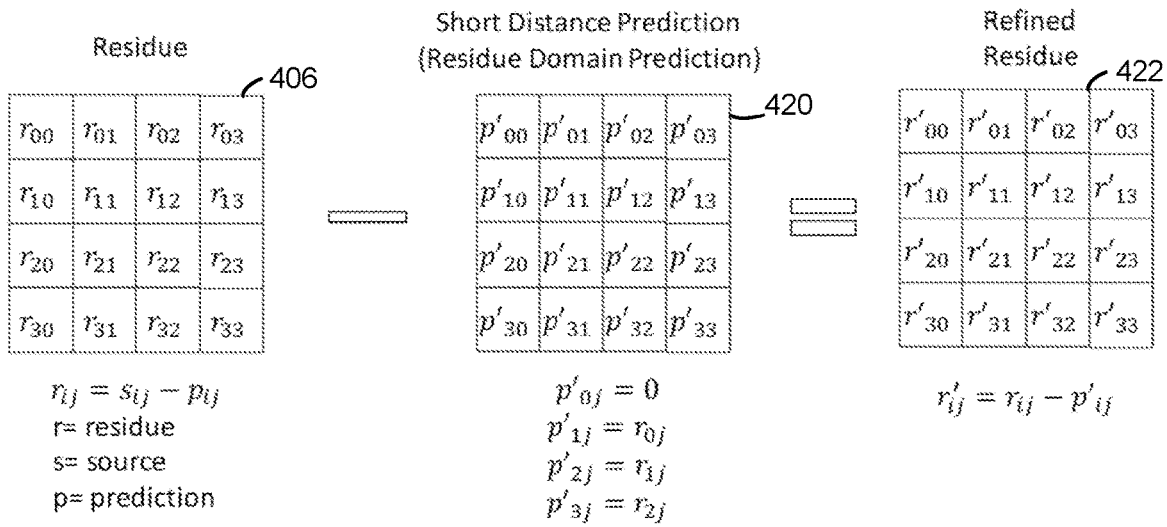
FIGS. 4F and 4G illustrates example line-by-line predictions in accordance with some embodiments.

FIG. 4F illustrates an example line-by-line prediction for an encoding process in accordance with some embodiments. In the example of FIG. 4F, a residue block 406 includes samples $r_{ij}$ and a refined prediction block 420 includes samples $p_{ij}'$. The residue block 406 may be obtained by applying an intra prediction to a current block. The residue prediction block 420 in FIG. 4F is obtained via a line-by-line vertical prediction. In the example of FIG. 4F, the residue prediction block 420 samples $p_{ij}'$ are subtracted from the residue block 406 samples $r_{ij}$ to obtain a refined residue block 422 with samples $r_{ij}'$. In some embodiments, the refined residue block 422 is used to generate refined residue coefficients, which are signaled in a subsequent bitstream.

Figure 4G:
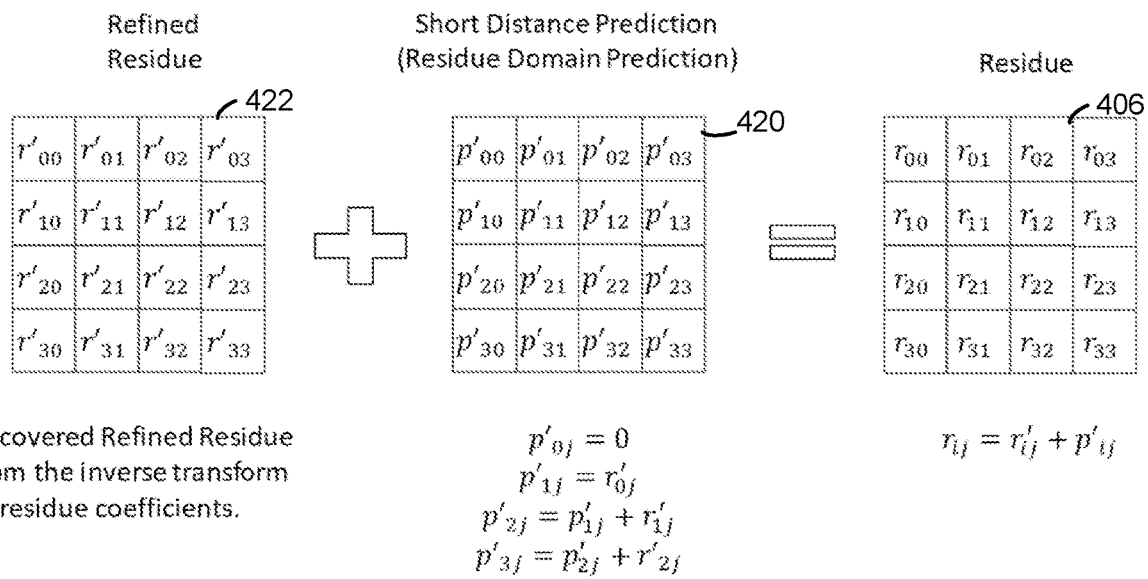

FIG. 4G illustrates an example line-by-line prediction for a decoding process in accordance with some embodiments. In the example of FIG. 4G, a refined residue block 422 is obtained (e.g., by applying an inverse transform to residue coefficients received via a bitstream) and includes samples $r_{ij}'$. A residue prediction block 420 with samples $p_{ij}'$ in FIG. 4G is obtained via a line-by-line vertical prediction. In the example of FIG. 4G, the residue prediction block 420 samples $p_{ij}'$ are added to the refined residue block 422 samples $r_{ij}'$ to recover the residue block 406 with samples $r_{ij}$. In some embodiments, the recovered residue block is used to obtain a reconstructed block for a current block.

Figure 5A:
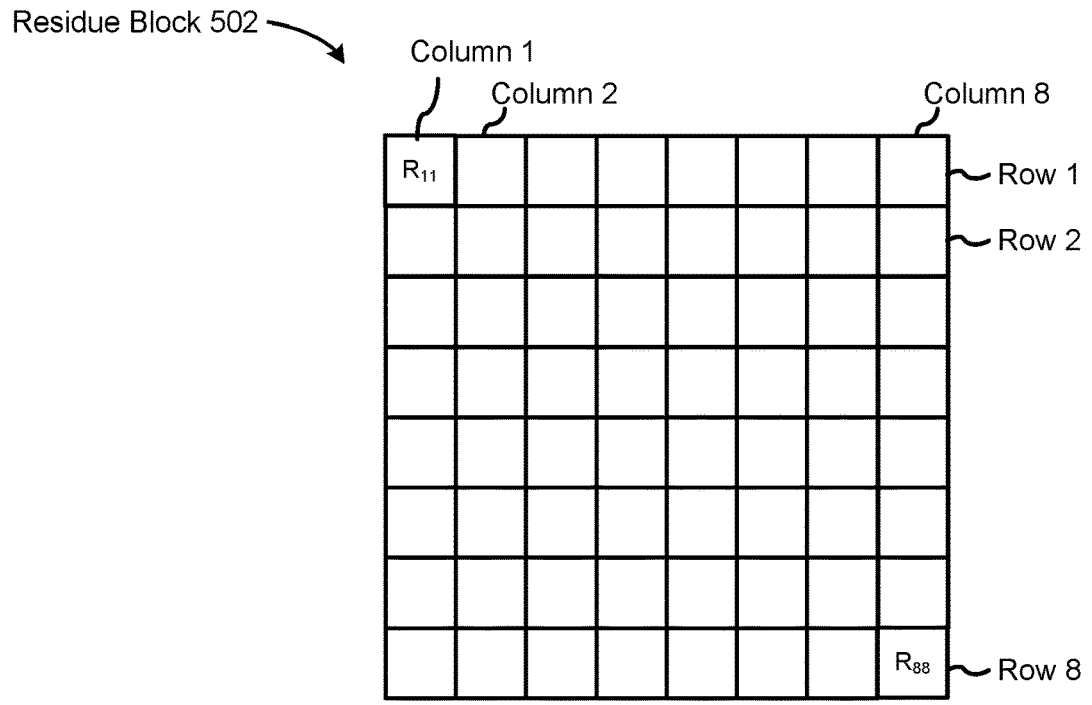
FIGS. 5A and 5B illustrate an example residue block in accordance with some embodiments.
Figure 5B:
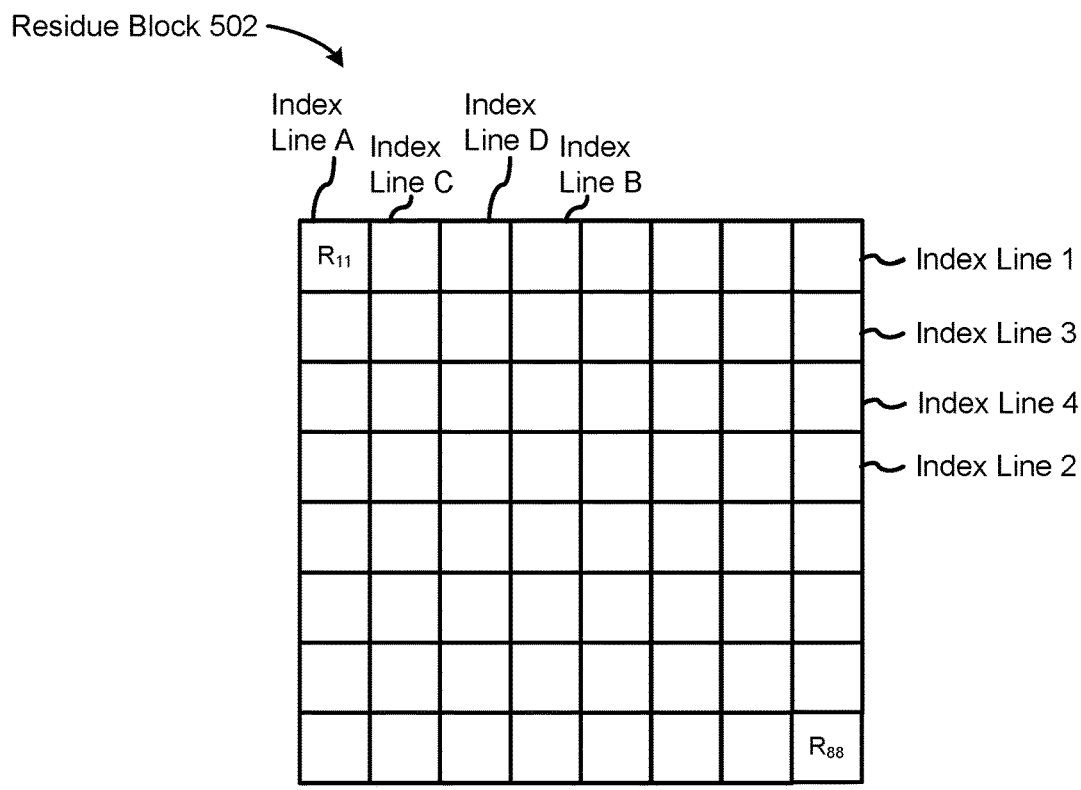

FIGS. 5A and 5B illustrate an example residue block in accordance with some embodiments. FIG. 5A shows a residue block 502 that includes a set of residues $R_{11}$ through $R_{88}$, corresponding to row 1 through row 8 and column 1 through column 8. FIG. 5B shows the residue block 502 with index line 1 (e.g., corresponding to row 1), index line 2 (e.g., corresponding to row 4), index line 3 (e.g., corresponding to row 2), and index line 4 (e.g., corresponding to row 3). In FIG. 5B the residue block 502 also includes index line A (e.g., corresponding to column 1), index line B (e.g., corresponding to column 4), index line C (e.g., corresponding to column 2), and index line D (e.g., corresponding to column 3).

Additional residue prediction techniques are described below. The disclosed techniques may be used separately or combined in any order. These techniques, along with the encoder and decoder approaches, can be executed using processing circuitry, which could comprise one or more processors or integrated circuits. As an example, a program stored in a non-transitory computer-readable medium can be executed by one or more processors.

Figures 6A, 6B:
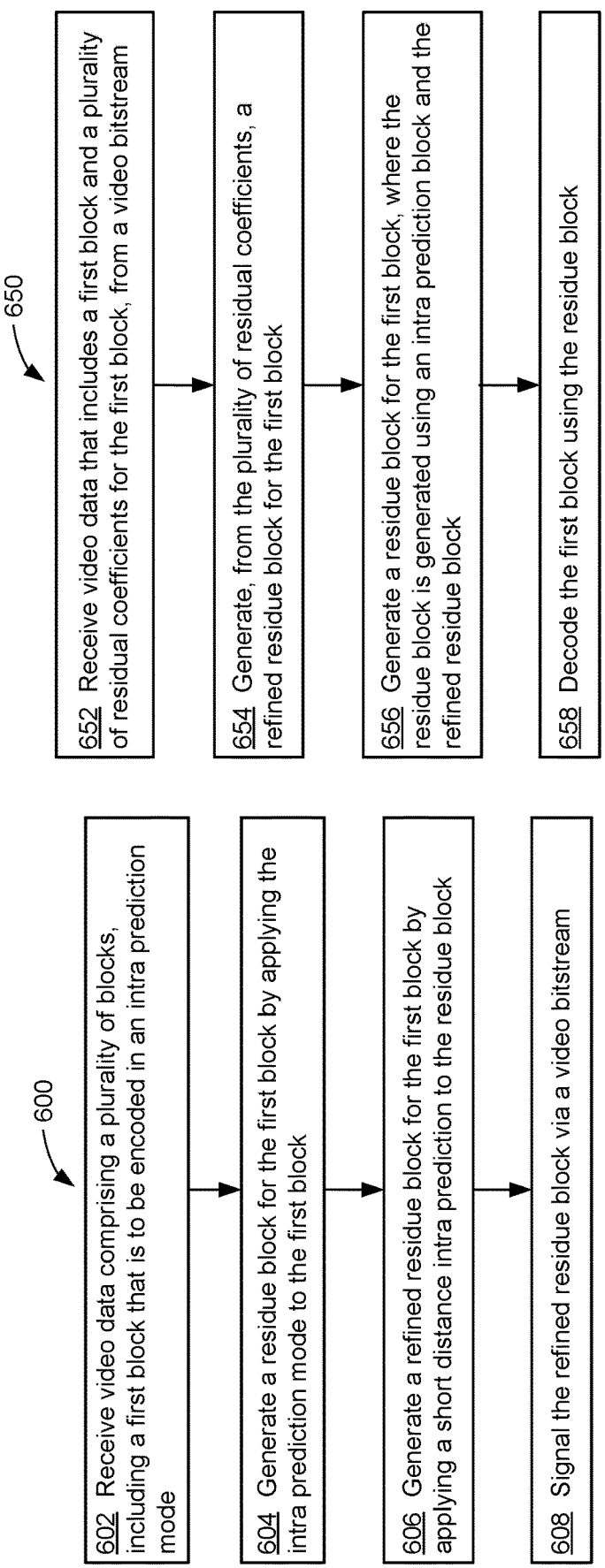
FIG. 6A is a flow diagram illustrating a method of encoding video in accordance with some embodiments.
FIG. 6B is a flow diagram illustrating a method of decoding video in accordance with some embodiments.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) video data comprising a plurality of blocks, including a first block (e.g., the current block 402) that is to be encoded in an intra prediction mode. For example, the system receives the video data from a video source (e.g., the video source 104). The system generates (604) a residue block (e.g., the residue block 406) for the first block by applying the intra prediction mode to the first block. In some embodiments, the intra prediction mode is selected from a group consisting of: one or more directional intra predictions, one or more smooth intra predictions, one or more cross color intra predictions (e.g., chroma from luma), one or more recursive intra predictions, an intra block copy prediction, and a color palette prediction. The system generates (606) a refined residue block (e.g., the refined residue block 420) for the first block by applying a short distance intra prediction to the residue block. In some embodiments, the short distance intra prediction is a line-by-line prediction. In some embodiments, the short distance intra prediction is a bi-directional prediction. The system signals (608) the refined residue block via a video bitstream. In some embodiments, the system signals differences between the refined residue block and the residue block (e.g., as residual coefficients).

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data that includes a first block (e.g., the current block 402) and a plurality of residual coefficients (e.g., the residual coefficients shown in FIG. 4D) for the first block, from a video bitstream. The system generates (654), from the plurality of residual coefficients, a refined residue block (e.g., the reconstructed residue block 408) for the first block. For example, the system applies an inverse quantization and one or more inverse transforms to generate the refined residue block (e.g., the reconstructed residue block 408). The system generates (656) a residue block for the first block, where the residue block is generated using an intra prediction block and the refined residue block. The system decodes (658) the first block using the residue block. For example, the system generates a reconstructed block (e.g., the reconstructed block 410) for the first block.

Although FIGS. 6A and 6B illustrates a number of logical stages in particular orders, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In some embodiments, an intra prediction is conducted on a coded block, or on each sub-block in the coded block, yielding a residue block by subtracting the prediction block from the reconstructed samples of neighboring blocks. In some embodiments, a short distance intra prediction is applied to the residue block, resulting in a refined residue block. In some embodiments, the intra prediction is conducted on an M×N block regardless of the size of the coded block. Example values of M and N include, but are not limited to 1, 2, 4, 8, 16, 32, and 64. In some embodiments, short distance intra prediction is applied to the residue block for a lossless coding mode.

In some embodiments, a line-by-line prediction is used as the short distance intra prediction. For example, the residues in a particular row or column are predicted using their adjacent preceding lines, and the difference between the residues and the predicted residues serves as the input for the subsequent transform, quantization, or entropy coding process. In some embodiments, the line-by-line prediction is applied to samples/residues in all the rows or columns except the samples/residues in the first row/column. In some embodiments, for the first row/column, the prediction is performed using the residual samples generated by multiple reconstruction rows/columns of neighboring blocks. In some embodiments, the line-by-line prediction is performed on residues in the horizontal direction. For example, the predicted residues for the first row are set to zeros, and predicted residues of subsequent rows are predicted from their neighboring preceding rows. In some embodiments, the line-by-line prediction is performed on residues in the vertical direction. For example, the predicted residues for the first column are set to zeros, and predicted residues subsequent columns are predicted by the adjacent columns that precede them.

In some embodiments, the short distance intra prediction is a bi-directional prediction. In some embodiments, the bi-directional prediction is applied to each M×N residue block. For example, the predicted residues for residues in a first index line and a second index line of the M×N residue blocks are set to zeros, and the residues in the third index and fourth index lines are predicted using a weighted average of the residues in the first index and second index lines. In some embodiments, the difference between the residues and the predicted residues serves as the input for the subsequent transform, quantization, or entropy coding process. Example values of M and N include, but not are limited to 1, 2, 4, 8, 16, 32, and 64. In some embodiments, the first line and the second line are not adjacent lines. Examples of the first index line and the second index line include, but not limited to the first line and the fourth line along the given direction, respectively. Examples of the third index line and the fourth index line include, but not limited to the second line and the third line along the given direction, respectively. In some embodiments, the weighting factors used for weighted averaging of the residues in the first index and second index lines depend on the distance between the residues and its predictors. For example, the weighting factors for the residues in the first index and second index lines are $\{2/3, 1/3\}$ or $\{3/4, 1/4\}$ when predicting the residues in the second row/column. As another example, the weighting factors for the residues in the first index and second index lines are $\{1/3, 2/3\}$ or $\{1/4, 3/4\}$ when predicting the residues in the third row/column.

In some embodiments, the bi-directional prediction is performed in the horizontal direction. For example, the predicted residues in the first index and second index lines are set to zeros. In this example, the residues in the third and fourth index lines are predicted by weighted averaging the residues in the first and fourth rows. In some embodiments, the bi-directional prediction is performed in the vertical direction. For example, the predicted residues in the first index and second index lines are set to zeros. In this example, the residues in the third and fourth index lines are predicted by weighted averaging the residues in the first and fourth rows.

In some embodiments, for the short distance intra prediction, the residues in a subsequent line are predicted using a weighted average of residues from multiple adjacent lines. In some embodiments, the weighting factors for weighted averaging the residues in multiple adjacent lines depend on the distance between residues in the current line and the residues in adjacent lines. In some embodiments, residues in two adjacent lines are employed to predict the residues in current line, the weighting factor for the residues in the nearest adjacent line is set to a first value, and the weighting factor for residues in another line is set to a second value. Examples of the first and second values include, but not limited to ⅔ and ⅓, respectively.

In some embodiments, multiple short distance prediction methods are sequentially applied to the residue block. For example, a line-by-line prediction method is first applied to the residue block to generate a refined residue block, and then a bi-directional prediction method is applied to the refined residue block to generate a final residue block.

In some embodiments, a flag is signaled in the bitstream to indicate which short distance intra prediction method is applied to the residue block. In some embodiments, two separate flags are employed to signal the utilization of short-distance prediction for luma and chroma residue block planes. In some embodiments, the direction of the short-distance prediction for residue block is signaled in the bitstream. In some embodiments, the direction of the short-distance residue block prediction is inferred by the intra prediction mode. In some embodiments, the context for entropy coding of the flag of short distance prediction for chroma residue block depends on the corresponding luma flag. In some embodiments, whether one or more of the short distance intra predictions are applied is signaled in a high-level syntax, including but not limited to a sequence flag, a GOP flag, a picture flag, a subpicture flag, a slice flag, or a tile level flag.

In some embodiments, a first direction is employed in the intra prediction on a coded block, or on each sub-block in the coded block, yielding a residue block by subtracting the prediction block from the reconstructed samples of neighboring blocks. Then, a second direction is employed in a short distance residue prediction to predict the residues, and the difference between the residues and the predicted residues serves as the input for the subsequent processing including but not limited to transform, quantization, entropy coding, and in-loop filtering. At the decoder, the difference between residues and the predicted residues are parsed and then added to the predicted residues to derive the reconstructed residual samples.

In some embodiments, the direction of the first direction and the second direction is different. In some embodiments, the direction of the second direction is the same as the direction of the first direction. In some embodiments, the value of the first direction is used as the context for entropy coding the second direction. In some embodiments, a high level syntax is signaled in the bitstream (including but not limited to sequence level, frame level, slice level, super block level) to indicate whether the second direction is the same as the first direction.

In some embodiments, a line-by-line prediction or a bi-directional prediction is used as short distance prediction. For example, a line-by-line prediction is employed as one short distance intra prediction in residual block, and the residues in a particular line are predicted using their adjacent preceding line. As another example, a bi-directional prediction is employed as a short distance intra prediction in residual block, and the predicted residues for residues in a first index line and a second index line of the residue block are set to zero, while the residues in the third and fourth index lines are predicted using a weighted average of the residues in the first and second index lines.

In some embodiments, the angle of the second direction for short distance residue prediction is implicitly determined based on the angle of the first direction for intra prediction. In some embodiments, a short distance prediction is performed on residues in horizontal direction if the prediction angle for intra prediction is closer to the horizontal direction when compared to the vertical direction. In some embodiments, a short distance prediction is performed on residues in a vertical direction if the prediction angle for the intra prediction is closer to the vertical direction than to the horizontal direction. In some embodiments, a short distance prediction is performed on residues in a diagonal direction if the prediction angle for the intra prediction is closer to the diagonal direction than to the horizontal or vertical directions. In some embodiments, the short distance prediction is applied to the N nominal angles used for intra prediction. For example, N is equal to 4, 6, 8, or 10.

In some embodiments, one or more syntax elements are signaled in the bitstream to indicate the direction/angle of the short distance prediction direction. In some embodiments, a syntax element that indicates the direction of the short distance prediction is signaled in the bitstream. In some embodiments, a first syntax element is used to indicate the nominal/primary direction and a second syntax element is used to indicate the angle delta to the nominal direction. In some embodiments, the supported values for the delta angle are predefined in a look-up table, and the index of the delta angle in the look-up table is signaled in the bitstream. As an example, a first syntax is signaled to indicate whether the direction for short distance residue prediction is vertical or horizontal, then a second syntax is signaled to indicate the angle delta to the specified primary direction.

In some embodiments, a first syntax element is used to indicate the nominal direction; a second syntax element is used to indicate whether the angle delta is zero. If the angle delta is not zero, the third and fourth syntax elements are further used. The third syntax element is used to indicate the positive value or negative value of the angle delta. The fourth syntax element is used to indicate the absolute angle delta.

In some embodiments, only an angle delta syntax is signaled to derive the second direction (e.g., the prediction direction used by the residual prediction), then the direction used by the residual prediction is derived by adding the angle delta value to the nominal prediction direction (or the prediction direction) of the intra prediction mode.

Some embodiments include transform coding techniques for short distance residue prediction. In some embodiments, for processing a residue block, the selection of transform coding mode is signaled at a first processing unit level, and the transform process is performed at a second processing unit level, where the transform coding mode refers to any parameter or operation that is involved in the transform process, and the transform method can be applied in a forward transform process at the encoder, or an inverse transform process at the encoder and/or decoder. For example, the range of the first processing unit level and the second processing unit level may include the sequence level, frame level, super block level, coded block level, predicted block level, or transform block level.

In some embodiments, a residue block generated from an intra prediction or a refined residue block serves as the input for transform process. In some embodiments, intra prediction is conducted on a coded block, or each sub-block in the coded block, yielding a residue block by subtracting the prediction block from the reconstructed samples of neighboring blocks. In some embodiments, a short distance intra prediction method is applied to the residue block, resulting in a refined residue block. In some embodiments, the refined residue block serves as the input for the subsequent transform coding. In some embodiments, different transform kernels can be applied to the refined residual blocks. For example, a transform is not applied (or the transform kernel is identity transform) to the refined residual block. As an example, a transform is not applied (or an identity transform is applied) on one direction (e.g., horizontal, or vertical) and a lossless transform (e.g., Hadamard transform) is applied on another direction.

In some embodiments, the first and second processing unit levels are the same. In some embodiments, the type of transform coding mode is signaled in the coding block level, the refined residual block's size is the same as the coding block size, and the transform coding block size is also the same as the coding block size. For example, the syntax element for the transform block size may be inferred from the refined residual block size or the coding block size and there is no need to signal the syntax element of the transform block size.

In some embodiments, the first and second processing unit levels are different. In some embodiments, the type of transform coding kernel is signaled in the coding block level, but the transform block size for performing transform process is smaller than the coding block size. In some embodiments, the transform block size is fixed, and the same transform coding kernel is applied on the transform coding blocks within one coded block. For example, the syntax element for the transform block size does not need to be signaled in the bitstream. In one example, the identity transform is signaled in the coding block level and the transform size is fixed at M×N no matter the coding block size. In another example, the Hadamard transform (or a different lossless transform) is signaled in the coding block level and the transform size is fixed at M×N regardless of the coding block size. In some embodiments, M and N are selected to correspond to the smallest allowable transform size (e.g., M and N are both equal to 4).

In some embodiments, the transform block size and transform coding mode are determined by a given cost metric at the encoder. For example, the best transform coding type and best transform size are signaled in the coding block level. In one example, the cost metric is the rate-distortion cost used in the Rate Distortion Optimization.

In some embodiments, whether the first and second processing unit levels are different is signaled at high-level syntax, including but not limited to sequence, GOP, frame, or slice-level.

In some embodiments, a transform scheme includes applying a transform skip (or identity transform) on one direction (e.g., horizontal, or vertical direction) and a Hadamard transform on the other direction. In some embodiments, the transform scheme is applied only to lossless coding mode. In some embodiments, the transform scheme is applied only at a specific M×N transform block size (e.g., 4×4 transform block size). In some embodiments, the selection of whether to transform skip (or identity transform) or Hadamard transform is signaled for each direction separately. Turning now to some example embodiments.

(A1) In one aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data comprising a plurality of blocks, including a first block (e.g., the current block 402), where the first block is to be encoded in an intra prediction mode; (ii) generating a residue block for the first block by applying the intra prediction mode to the first block; (iii) generating a refined residue block for the first block by applying a short distance intra prediction to the residue block; and (iv) signaling the refined residue block via the video bitstream. In some embodiments, generating the refined residue block for the first block comprises applying multiple short distance intra predictions. For example, multiple short distance prediction methods may be sequentially applied to the residue block. As an example, a line-by-line prediction is applied to the residue block to generate a refined residue block, and then a bi-directional prediction is applied to the refined residue block to generate the final residue block. In some embodiments, the short distance intra prediction mode is applied as part of a lossless coding scheme.

(A2) In some embodiments of A1, the method further includes transmitting the encoded first block via the video bitstream.

(A3) In some embodiments of A1 or A2, the method further includes determining differences between the residue block and the refined residue block. For example, the residues in a particular row or column are predicted using their adjacent preceding lines. The difference between the residues and the predicted residues serves as the input for the subsequent transform, quantization, or entropy coding process.

(A4) In some embodiments of any of A1-A3, the intra prediction mode is applied to an M×N portion of the residue block, M and N being positive integers.

(A5) In some embodiments of any of A1-A4, the short distance intra prediction comprises a line-by-line prediction in which residues in a particular row or column are predicted using an adjacent preceding row or column.

(A6) In some embodiments of any of A1-A5, the short distance intra prediction comprises a bi-directional prediction in which residues in a third index line and a fourth index line of the residue block are predicted using a weighted average of residues in a first index line and a second index line of the residue block.

(A7) In some embodiments of any of A1-A6, the method further includes signaling a syntax element in the video bitstream, where the syntax element indicates which type of short distance intra prediction is to be applied (e.g., a line-by-line prediction or a bi-directional prediction).

(A8) In some embodiments of any of A1-A7, the method further includes signaling a first flag to indicate utilization of a short distance intra prediction mode for a chroma plane and a second flag to indicate utilization of the short distance intra prediction mode for a luma plane.

(B1) In another aspect, some embodiments include a method (e.g., the method 650) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254), a motion prediction component (e.g., the motion compensation prediction unit 260), and/or an intra prediction component (e.g., intra picture prediction unit 262). The method includes: (i) receiving video data (e.g., a coded video sequence) comprising a plurality of blocks, including a first block and a plurality of residual coefficients for the first block, from a video bitstream; (ii) generating, from the plurality of residual coefficients, a refined residue block for the first block; (iii) generating a residue block for the first block, where the residue block is generated using an intra prediction block and the refined residue block; and (iv) reconstructing the first block using the residue block. For example, the refined residue block is generated by applying inverse quantization and/or inverse transforms to the plurality of residual coefficients. As an example, the residue block represents differences between a reconstructed sample and a corresponding prediction value.

(B2) In some embodiments of B1, the intra prediction mode is applied to an M×N portion of the first block, M and N being positive integers. In some embodiments, the intra prediction mode is applied at each M×N unit of the first block. For example, the intra prediction is performed on the M×N block regardless of the size of the residue block. Example values for M and N include 1, 2, 4, 8, 16, 32, and 64.

(B3) In some embodiments of B1 or B2, the short distance intra prediction comprises a line-by-line prediction in which residues in a particular row or column are predicted using an adjacent preceding row or column. For example, a line-by-line prediction is employed as one short distance intra prediction. The residues in a particular row or column are predicted using their adjacent preceding lines. In some embodiments, the residues in a subsequent line are predicted using a weighted average of residues from multiple adjacent lines and/or multiple preceding lines. For example, the weighting factors for weighted averaging the residues in multiple adjacent lines may depend on the distance between residues in the current line and the residues in adjacent lines. In some embodiments, residues in two adjacent lines are employed to predict the residues in a current line, and the weighting factor for the residues in the nearest adjacent line is set to a first value, and the weighting factor for residues in another line is set to a second value. Examples of the first and second values include, but not limited to ⅔ and ⅓, respectively.

(B4) In some embodiments of B3, the line-by-line prediction is applied to each row or column of the residue block except a first row or a first column. For example, the first row is the leftmost row. As another example, the first column is the topmost column. For example, this prediction technique is applied to samples/residues in all the rows or columns except the samples/residues in the first row/column. In some embodiments, for the first row/column, the prediction is performed using the residual samples generated by multiple reconstruction rows/columns of neighboring blocks. In some embodiments, the line-by-line prediction is applied to each row or column of an M×N portion of the residue block except a first row or a first column.

(B5) In some embodiments of B3 or B4, the line-by-line prediction is performed in a horizontal direction, wherein residues for a first column of the residue block are set to zero, and wherein residues for other columns of the residue block are predicted from preceding columns. For example, the predicted residues for the first column are set to zeros, while predicted residues of subsequent columns are predicted from their neighboring preceding rows. In some embodiments, residues for a first column of an M×N portion of the residue block are set to zero, and residues for other columns of the M×N portion are predicted from preceding columns.

(B6) In some embodiments of B3 or B4, the line-by-line prediction is performed in a vertical direction, wherein residues for a first row of the residue block are set to zero, and wherein residues for other rows of the residue block are predicted from preceding rows. For example, the predicted residues for the first column are set to zeros, while predicted residues of subsequent columns are predicted from their neighboring preceding rows. In some embodiments, residues for a first row of an M×N portion of the residue block are set to zero, and residues for other rows of the M×N portion are predicted from preceding rows.

(B7) In some embodiments of any of B1-B6, the short distance intra prediction comprises a bi-directional prediction in which residues in a third index line and a fourth index line of the residue block are predicted using a weighted average of residues in a first index line and a second index line of the residue block. For example, a bi-directional prediction is applied to each M×N residue block. In some embodiments, the residues in a particular index line are predicted using a weighted average of residues from multiple adjacent lines and/or multiple preceding lines. For example, the weighting factors for weighted averaging the residues in multiple adjacent lines may depend on the distance between residues in the current line and the residues in adjacent lines.

(B8) In some embodiments of B7, the bi-directional prediction includes setting predicted residues for residues in the first index line and the second index line to zero. In some embodiments, the predicted residues for residues in the first index line and the second index line of M×N residue blocks are set to zeros.

(B9) In some embodiments of B7 or B8, the first index line and the second index line are not adjacent lines. Examples of the first index line and the second index line include, but not limited to the first line and the fourth line along the given direction, respectively. Examples of the third index line and the fourth index line include, but not limited to the second line and the third line along the given direction, respectively.

(B10) In some embodiments of any of B7-B9, weights for the weighted average of residues are based on respective distances between each residue and corresponding predictors. For example, the weighting factors used for weighted averaging the residues in the first index line and the second index line may depend on the distance between the residues and their predictors. As an example, the weighting factors for the residues in the first and second index lines are {⅔, ⅓} or {¾, ¼} when predicting the residues in the second row/column. As another example, the weighting factors for the residues in the first and second index lines are {⅓, ⅔} or {¼, ¾} when predicting the residues in the third row/column.

(B11) In some embodiments of any of B7-B10, the bi-directional prediction is performed in a horizontal direction, and wherein predicted residues in the third index line and/or the fourth index line are predicted by a weighted average of residues in first and fourth columns of the residue block. For example, the predicted residues in the first index and second index lines are set to zeros, and the residues in the third and fourth index lines are predicted by weighted averaging the residues in the first and fourth columns.

(B12) In some embodiments of any of B7-B10, the bi-directional prediction is performed in a vertical direction, and wherein predicted residues in the third index line and/or the fourth index line are predicted by a weighted average of residues in first and fourth rows of the residue block. For example, the predicted residues in the first index and second index lines are set to zeros, and the residues in the third and the residues in the third and fourth index lines are predicted by weighted averaging the residues in the first and fourth rows.

(B13) In some embodiments of any of B1-B12: (i) the video bitstream further includes a syntax element; and (ii) in accordance with the syntax element having a first value, a first type of short distance intra prediction is applied to the residue block, and (iii) in accordance with the syntax element having a second value, a second type of short distance intra prediction is applied to the residue block. For example, a flag is signaled in the bitstream to indicate which short distance intra prediction method is applied to the residue block. In some embodiments, the direction of the short-distance prediction for residue block is signaled in the bitstream. In some embodiments, the direction of the short-distance residue block prediction is inferred by the intra prediction mode. In some embodiments, the syntax element is a high-level syntax (HLS) element. In some embodiments, the HLS is signaled at a level that is higher than a block level. For example, the HLS may correspond to a sequence level, a frame level, a slice level, or a tile level. As another example, the HLS may be signaled in a video parameter set (VPS), a sequence parameter set (SPS), a picture parameter set (PPS), an adaptation parameter set (APS), a slice header, a picture header, a tile header, and/or a CTU header.

(B14) In some embodiments of any of B1-B13, the video bitstream includes a first flag to signal utilization of a short distance intra prediction mode for a chroma plane and a second flag to signal utilization of the short distance intra prediction mode for a luma plane. For example, two separate flags are employed to signal the utilization of short-distance prediction for luma and chroma residue block planes. In some embodiments, the context for entropy coding of the flag of short distance prediction for chroma residue block depends on a corresponding luma flag.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A8 and B1-B14 above). In yet another aspect, some embodiments include a non-transitory computer-readable storage medium storing one or more sets of instructions for execution by control circuitry of a computing system, the one or more sets of instructions including instructions for performing any of the methods described herein (e.g., A1-A8 and B1-B14 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving video data comprising a plurality of blocks, including a first block and a plurality of residual coefficients for the first block, from a video bitstream;
   generating, from the plurality of residual coefficients, a refined residue block for the first block;
   generating a reconstructed residue block for the first block, wherein the reconstructed residue block is generated using a short distance intra prediction and the refined residue block; and
   reconstructing the first block using the reconstructed residue block and an intra prediction block.

2. The method of claim 1, wherein the short distance intra prediction is applied to an M×N portion of the first block, M and N being positive integers.

3. The method of claim 1, wherein the short distance intra prediction comprises a line-by-line prediction in which residues in a particular row or column are predicted using an adjacent preceding row or column.

4. The method of claim 3, wherein the line-by-line prediction is applied to each row or column of the refined residue block except a first row or a first column.

5. The method of claim 3, wherein the line-by-line prediction is performed in a horizontal direction, wherein residues for a first column of the refined residue block are set to zero, and wherein residues for other columns of the refined residue block are predicted from preceding columns.

6. The method of claim 3, wherein the line-by-line prediction is performed in a vertical direction, wherein residues for a first row of the refined residue block are set to zero, and wherein residues for other rows of the refined residue block are predicted from preceding rows.

7. The method of claim 1, wherein the short distance intra prediction comprises a bi-directional prediction in which residues in a third index line and a fourth index line of the refined residue block are predicted using a weighted average of residues in a first index line and a second index line of the refined residue block.

8. The method of claim 7, wherein the bi-directional prediction includes setting predicted residues for residues in the first index line and the second index line to zero.

9. The method of claim 7, wherein the first index line and the second index line are not adjacent lines.

10. The method of claim 7, wherein weights for the weighted average of residues are based on respective distances between each residue and corresponding predictors.

11. The method of claim 7, wherein the bi-directional prediction is performed in a horizontal direction, and wherein predicted residues in the third index line and/or the fourth index line are predicted by a weighted average of residues in first and fourth columns of the refined residue block.

12. The method of claim 7, wherein the bi-directional prediction is performed in a vertical direction, and wherein predicted residues in the third index line and/or the fourth index line are predicted by a weighted average of residues in first and fourth rows of the refined residue block.

13. The method of claim 1, wherein:
the video bitstream further includes a syntax element;
in accordance with the syntax element having a first value, a first type of short distance intra prediction is applied to the refined residue block; and
in accordance with the syntax element having a second value, a second type of short distance intra prediction is applied to the refined residue block.

14. The method of claim 1, wherein the video bitstream includes a first flag to signal utilization of a short distance intra prediction mode for a chroma plane and a second flag to signal utilization of the short distance intra prediction mode for a luma plane.

15. A computing system, comprising:
control circuitry;
memory; and
one or more sets of instructions stored in the memory and configured for execution by the control circuitry, the one or more sets of instructions comprising instructions for:
receiving video data comprising a plurality of blocks, including a first block and a plurality of residual coefficients for the first block, from a video bitstream;
generating, from the plurality of residual coefficients, a refined residue block for the first block;
generating a reconstructed residue block for the first block, wherein the reconstructed residue block is generated using a short distance intra prediction block and the refined residue block; and
reconstructing the first block using the reconstructed residue block and an intra prediction block.

16. The computing system of claim 15, wherein the short distance intra prediction is applied to an M×N portion of the first block, M and N being positive integers.

17. The computing system of claim 15, wherein the short distance intra prediction comprises a line-by-line prediction in which residues in a particular row or column are predicted using an adjacent preceding row or column.

18. The computing system of claim 15, wherein the short distance intra prediction comprises a bi-directional prediction in which residues in a third index line and a fourth index line of the refined residue block are predicted using a weighted average of residues in a first index line and a second index line of the refined residue block.

19. A non-transitory computer-readable storage medium storing one or more sets of instructions configured for execution by a computing device having control circuitry and memory, the one or more sets of instructions comprising instructions for:
receiving video data comprising a plurality of blocks, including a first block and a plurality of residual coefficients for the first block, from a video bitstream;
generating, from the plurality of residual coefficients, a refined residue block for the first block;
generating a reconstructed residue block for the first block, wherein the reconstructed residue block is generated using a short distance intra prediction block and the refined residue block; and
reconstructing the first block using the reconstructed residue block and an intra prediction block.

20. The non-transitory computer-readable storage medium of claim 19, wherein the short distance intra prediction comprises a line-by-line prediction in which residues in a particular row or column are predicted using an adjacent preceding row or column.

* * * * *